US012767771B2

(12) United States Patent
Lundahl et al.

(10) Patent No.: US 12,767,771 B2
(45) Date of Patent: Oct. 20, 2026

(54) METHOD FOR PRODUCING COMPOSITE STRUCTURE COMPRISING MAGNETIC FILLER MATERIAL EMBEDDED IN A RESIN MATRIX

(71) Applicant: TERALOOP OY, Helsinki (FI)

(72) Inventors: Meri Lundahl, Helsinki (FI); Markus Merilä, Helsinki (FI); Maximillian de Rozieres Gentilhomme De Laveline, Espoo (FI)

(73) Assignee: TERALOOP OY, Helsinki (FI)

( * ) Notice: Subject to any disclaimer, the term of this patent is extended or adjusted under 35 U.S.C. 154(b) by 0 days.

(21) Appl. No.: 17/674,480

(22) Filed: Feb. 17, 2022

(65) Prior Publication Data

US 2022/0259387 A1 Aug. 18, 2022

(30) Foreign Application Priority Data

Feb. 18, 2021 (FI) ...................................... 20217034

(51) Int. Cl.
*C08J 3/24* (2006.01)
*C08K 3/013* (2018.01)
*H01F 1/26* (2006.01)

(52) U.S. Cl.
CPC ............... *C08J 3/242* (2013.01); *C08K 3/013* (2018.01); *H01F 1/26* (2013.01); *C08J 2300/22* (2013.01); *C08J 2300/24* (2013.01); *C08K 2201/01* (2013.01)

(58) Field of Classification Search
CPC ..... H01F 1/26; H01F 1/28; H01F 1/37; H01F 1/0558; H01F 1/08; H01F 1/083; H01F 1/113; H01F 1/15366; H01F 1/15375; C08K 2201/01; C08L 63/00–10
See application file for complete search history.

(56) References Cited

U.S. PATENT DOCUMENTS 3,630,667 A * 12/1971 Shirk .................. C04B 35/2683 423/594.2
3,969,499 A * 7/1976 Lee, Jr. .................. C08G 18/69 424/52
4,425,250 A * 1/1984 Hibst ................. G11B 5/70678 252/62.62
4,880,692 A * 11/1989 Ryoke .................... G11B 5/735 428/323
4,925,886 A * 5/1990 Atkins et al.
5,456,734 A * 10/1995 Ryoke .................... B24D 3/342
7,683,123 B2 * 3/2010 Onoue ..................... C09D 7/67 524/847
2004/0099346 A1 * 5/2004 Nishiuchi ............ C22C 1/0441 148/302
2008/0258119 A1 10/2008 Kobayashi et al.
2013/0053471 A1 2/2013 Studart et al.
2013/0158167 A1 * 6/2013 Takenaka ............... C08G 59/42 523/456
2014/0018475 A1 * 1/2014 Falkner et al.
2015/0022309 A1 * 1/2015 Marusawa ................ H01F 1/01 252/62.55
2017/0275438 A1 9/2017 Kobayashi et al.
2020/0098495 A1 3/2020 Yoshimoto et al.
2020/0413542 A1 12/2020 Ooyama et al.
2022/0251368 A1 * 8/2022 Yamanaka .............. H01F 1/057

FOREIGN PATENT DOCUMENTS

CN 1645525 A 7/2005
CN 103862048 A 6/2014
JP H08148321 A * 6/1996
JP 2003213072 A 7/2003
JP 2005347449 A 12/2005
JP 2008147403 A 6/2008
JP 2009176974 A 8/2009
JP 2019182950 A 10/2019
JP 2020163833 A 10/2020

OTHER PUBLICATIONS

Partial machine translation of JP-H08148321-A (generated Dec. 28, 2023).*
Partial machine translation of JP 2019-182950 A (generated Dec. 28, 2023).*
Partial machine translation of JP 2009-182950 A (Year: 2009).*
Extended European Search Report for Application No. 22156826.4, dated Jun. 28, 2022, 15 pages.
Office Action for Finnish Application No. 20217034, dated Dec. 27, 2021, 8 pages.
Office Action for Finnish Patent Application No. 20217034, dated Feb. 16, 2024, 12 pages.

* cited by examiner

*Primary Examiner* — Kregg T Brooks
(74) *Attorney, Agent, or Firm* — Lippes Mathias LLP

(57) ABSTRACT

The present invention relates to a method for producing a composite structure comprising a magnetic filler material embedded in a resin matrix. So far, a balance between sufficient magnetic performance and mechanical fatigue resistance, for applications involving cyclic strains of hundreds of thousands of cycles, has not been achieved, largely due to the poor compatibility between metallic and plastic surfaces. The present invention solves this problem by embedding magnetic filler material in a resin, after the magnetic filler material has been subjected to a possible surface treatment for improving the adhesion of the magnetic filler material to the resin matrix in the composite structure. Further, a composite structure comprising magnetic filler material embedded in a resin matrix obtainable by the method as disclosed in the current specification is disclosed. Still further, the use of the composite structure in applications requiring magnetic properties and resistance to mechanical fatigue is disclosed.

19 Claims, 11 Drawing Sheets

METHOD FOR PRODUCING COMPOSITE STRUCTURE COMPRISING MAGNETIC FILLER MATERIAL EMBEDDED IN A RESIN MATRIX

CROSS-REFERENCE TO RELATED APPLICATIONS

This application claims the benefit of Finnish Application No. 20217034, filed Feb. 18, 2021, the contents of which are incorporated herein by reference.

FIELD OF THE INVENTION

The present invention relates to a method for producing a composite structure comprising a magnetic filler material embedded in a resin matrix. The present invention further relates to the composite structure. Still further, the present invention relates to the use of the composite structure.

BACKGROUND TO THE INVENTION

A plastic material can be made magnetically active by incorporating magnetic fillers, such as magnetic particles or magnetically modified fibers. However, a balance between sufficient magnetic performance and mechanical fatigue resistance, for applications involving cyclic strains of hundreds of thousands of cycles, has not yet been achieved. This is largely due to the poor compatibility between metallic and plastic surfaces. Plasma treatment of the particle surface to improve the adhesion in polymer-bonded magnets has not been reported.

PURPOSE OF THE INVENTION

The present invention improves the filler-matrix interfacial compatibility by subjecting the magnetic fillers to surface treatments, such as plasma treatment and/or coating for improving the adhesion of the magnetic filler material to the resin matrix in the composite structure. Further, a composite structure comprising magnetic filler material embedded in a resin matrix obtainable by the method as disclosed in the current specification is disclosed. This kind of composite structure is used in applications requiring both magnetic properties and resistance to mechanical fatigue.

DESCRIPTION OF THE INVENTION

A method for producing a composite structure comprising magnetic filler material embedded in a resin matrix is disclosed. The method may comprise:

- providing the magnetic filler material;
- subjecting the provided magnetic filler material to a surface treatment for improving the adhesion of the magnetic filler material to the resin matrix in the composite structure, wherein the surface treatment is selected from plasma treatment and/or coating of the magnetic filler material;
- mixing the surface treated magnetic filler material with the resin to form a composite composition, wherein the composite composition comprises magnetic filler material in an amount of at least 10 volume-% based on the total volume of the composite composition; and
- allowing the composite composition to cure to form the composite structure.

Further, a composite structure comprising magnetic filler material embedded in a resin matrix obtainable by the method as disclosed in the current specification is disclosed.

Still further, the use of the composite structure in applications requiring lightweight materials with magnetic properties and resistance to mechanical fatigue is disclosed.

As used herein, the terms "composite composition" or "composite" refer to a material comprising resin matrix and a magnetic filler material. If the cured composite structure comprises a reinforcing component such as carbon fiber, it may also be referred to as "reinforced plastic". In one embodiment, the composite composition comprises a magnetic fiber to form a reinforced plastic.

As used herein, the term "resin matrix" refers to the plastic component of the composite composition or the composite structure in either its cured or uncured form. As used herein, the term "resin" refers to the uncured form of the resin matrix. In the cases when hardeners are needed to induce the curing (thermoplastic resins), the term "resin" refers to the main component of the system (excluding hardener). Hardener can be added to the thermoset resin before or after the addition of magnetic fillers and/or other additives.

The resin matrix can be made magnetically active by incorporating magnetic filler material(s), such as magnetic particles or magnetically modified fibers therein. The resin matrix may be thermoplastic or thermoset. A surface treatment, such as coating or plasma treatment, may be applied onto the magnetic filler material in order to ensure adhesion with the plastic medium.

In one embodiment, the composite structure comprising the magnetic filler material embedded in a resin matrix exhibits high fatigue performance, intrinsic recyclability, or both.

The magnetic filler material may be provided using one of several methods known to a person skilled in the art. The magnetic filler material may be prefabricated, acquired commercially, or prepared during the method for producing the composite structure comprising magnetic filler material embedded in a resin matrix.

The magnetic filler material may be manufactured using any method known to a person skilled in the art. Such methods include, but are not limited to, co-precipitation, thermal decomposition, micro-emulsion synthesis, hydrothermal synthesis, and sono-chemical synthesis.

In one embodiment, the magnetic filler material is prepared by co-precipitation, thermal decomposition, micro-emulsion synthesis, hydrothermal synthesis, or sono-chemical synthesis in a solution of complexing agent to simultaneously provide the magnetic filler material with a surface treatment.

Without wishing to be bound by any particular theory, it may be considered that the adhesion of the resin matrix to the magnetic filler material may be dependent on the difference in surface energies of these two materials. The surface energies of magnetic filler materials and resins matrices are typically radically different, which may limit their interfacial adhesion. For example, the surface energy for a typical epoxy resin is approx. 46 $mJ/m^2$, while it is 1357 $mJ/m^2$ for $Fe_2O_3$ or 1770 $mJ/m^2$ for Ni. Due to this difference in surface energies, achieving good adhesion between the magnetic filler material and the resin matrix may be challenging. Plasma and coating treatments may decrease the surface energy of the magnetic material by introducing new chemical groups, such as hydroxyl, carboxyl, amine or alkyl groups. Thus, the difference in surface energies between the attached materials is reduced and thus the adhesion improved.

Furthermore, the chemical groups introduced during plasma treatment and/or coating may be selected so that they are able to chemically crosslink with the resin matrix. For example, if using an epoxy resin with a curing mechanism between epoxide and amine groups, amine groups can be introduced on the magnetic filler surface so that those also participate the curing with the epoxide groups in the epoxy. This creates a covalent bond between the filler surface and the surrounding resin, thus strengthening their adhesion.

When coating is used, a coating material may be chosen with chemical similarity with the resin matrix. The coating material can also be or contain a metal chelator or other agent that decreases the surface energy of the metal, a metal oxide, or a metal alloy surface and/or complexes between the surface and the resin. The coating material may be citric acid, malic acid, glutaric acid, tartronic acid, tartaric acid, mesoxalic acid, or oleic acid; any amino acid or phthalocyanine; or a compound containing both a hydroxyl (for affinity with the metal) and an amine group (for affinity with the resin matrix, can also be cured as part of the resin), e.g. ethanolamine, diethanolamine, or triethanolamine; amines containing at least two amino groups, such as 3-aminomethyl-3,5,5-trimethylcyclohexylamine (i.e., isophoronediamine), polyoxypropylenediamine m-phenylenebis (methylamine), 4-methylcyclohexane-1,3-diamine, 2-methylcyclohexane-1,3-diamine, diethylene triamine, triethylene tetramine, tetraethylene pentamine, dipropylene triamine, diethylamino propylamine, N-aminoethylpiperazine, isophoronediamine, xylylenediamine, metaphenylene diamine, diaminodiphenylmethane, diaminodiphenylsulfone polyamides, polyphenols, organic acids, isocyanates, polymercaptans, or any mixtures thereof.

In one embodiment, the surface treatment is a plasma treatment performed by exposing the magnetic filler material to plasma to generate bondable chemical groups (e.g. epoxy, amine, or hydroxyl) on the surface of the magnetic filler material. The plasma may be generated from air, oxygen, hydrocarbons (e.g. ethylene or propylene), alcohol(s) (e.g. ethanol or propanol) or from other gases, which can generate bondable chemical groups (e.g. epoxy, amine, or hydroxyl) on the surface of the magnetic material, or from a combination of any of the above. During the plasma exposure, the magnetic filler material may be mixed in any suitable way such as stirred, shaken, blown, or turned in order to ensure even surface coverage of the treatment. The treatment time may be adjusted according to the specific surface area of the filler magnetic material and may be at least 20 min/m$^2$, at least 25 min/m$^2$, or at least 30 min/m$^2$.

The surface area of the magnetic filler material may be determined by with sieves (e.g., particles that pass through a mesh screen with 2500 sieve openings per linear inch (2500 mesh) have a diameter of <5 μm), or through a BET measurement (Braunauer-Emmet-Teller surface area), or by imaging. In the case of powder with (approximately) spherical particles the surface area of the particles may be determined e.g. with electron microscopy and the average radius ($r_p$) of the spheres determined based on the images. Knowing the volume of the particles to be modified ($V_p$), this total volume can be approximated to consist of n spheres with the average radius $r_p$. This approximation allows calculating the total particle surface area as $A_p=n*4\pi r_p^2$, where $n=3V_p/(4\pi r_p^3)$. In the case of more complex shapes, image analysis techniques can be used to determine the surface area and volume of the particles. In the case of magnetically coated fibers with an (approximately) circular cross-section, the average fiber radius ($r_f$) can be determined based on electron micrographs. Knowing the volume of the fibers to be modified ($V_f$), this total volume can be approximated as a circular rod with length L and radius $r_f$. This approximation allows calculation of the total fibre surface area as $A_f=L*2\pi r_f$, where $L=V_f/(\pi r_f^2)$.

In one embodiment, the bondable groups generated on the surface of the magnetic filler material by the plasma treatment may be e.g. epoxy-bondable, or amino-bondable, or hydroxy-bondable. In one embodiment, the bondable groups generated on the surface of the magnetic filler material by the plasma treatment may be e.g. epoxy, or amino, or hydroxy.

In one embodiment, the surface treatment is the application of a coating on the magnetic filler material by immersing the magnetic filler material in a solution comprising a complexing agent or by preparing the magnetic filler material in the presence of a complexing agent. As used herein, the term "complexing agent" refers to a chemical compound that can form a complex with the surface of the magnetic filler material thus facilitating adhesion of the magnetic filler material to the resin matrix on curing. In one embodiment, the complexing agent is selected from a group consisting of citric acid, malic acid, glutaric acid, oleic acid, and phthalocyanine.

Coating can be applied by immersing the magnetic filler material into a complexing solution comprising a complexing agent such as citric acid, malic acid, glutaric acid, oleic acid, phthalocyanine, or any mixture or combination thereof in a solvent such as water, supercritical carbon dioxide, supercritical water, an organic solvent, or any mixture or combination thereof. As a non-limiting example, $Fe_3O_4$ particles or $Fe_3O_4$-coated fibers can be immersed in a solution of citric acid, malic acid, glutaric acid, or oleic acid, or phthalocyanine in a solvent such as water, supercritical carbon dioxide, supercritical water or an organic solvent. The molar ratio of Fe:Fe-complexing group (carboxylate or hydroxyl) can be at least 1:1 (containing an excess amount of complexing agent). Where needed, the amount of complexing agent and the ratio of complexing agent to magnetic filler material can be adjusted e.g. depending on the particle size. An increase in the particle size decreases the amount of complexing agent required in relation to the amount of magnetic filler material. If the particle size is large, the ratio can be as high as 400:1. After stirring the mixture for at least 10 min, e.g. for 30 min, the excess complexing agent is washed away, leaving behind only the agent that has complexed on the filler surface.

Alternatively, the coating can be applied during the filler preparation by exposing the filler to the complexing agent during or after the precipitation of the magnetic particles or deposition of the magnetic coating. The filler and agent should be allowed at least 10 min, or at least 15 min, or at least 20 min, or at least 25 min, or at least 30 min to complex, after which the excess complexing agent is removed by washing.

A coated magnetic filler material (separately coated prefabricated fillers or fillers coated in the process of their preparation) may be dried or used as a dispersion. If used as a dispersion, the solvent can be exchanged, e.g. to an organic solvent. The solvent can be selected so that it is fast to dry, if the fillers are subsequently dried. Alternatively, the solvent can be selected so that it is miscible with the resin in which the magnetic filler material is going to be mixed. If this approach is selected, the desired resin matrix or a chemically related one can be mixed into the dispersion in an amount that is 5-15 weight-% of the solvent mass. The solvent content of the magnetic filler material may be less than 1 weight-%, or 0.3-0.5 weight-% of the total weight of the composition. After stirring the mixture for at least 10 min, or at least 20 min, or at least 30 min, the magnetic filler material may be (partially) dried in an oven and/or vacuum.

In one embodiment, the method comprises mixing the surface treated magnetic filler material with the resin to form a composite composition. In one embodiment, the method comprises mixing the surface treated magnetic filler material with a thermoset resin and a hardener to form a composite composition.

As used herein, the term "hardener" refers to a chemical substance added to the resin to initiate the curing or hardening of said resin into a cured resin matrix. The hardener may be e.g. an anhydride, an amine, a polyamide, a polyphenol, an organic acid, an isocyanate, a polymercaptan, or any mixtures thereof.

In one embodiment, the composite composition comprises magnetic filler material in an amount of at least 20 volume-%, or at least 30 volume-%, or at least 35 volume-%, or at least 40 volume-%, or at least 45 volume-%, or at least 50 volume-% based on the total volume of the composite composition. In one embodiment, the composite composition comprises magnetic filler material in an amount of at least 75 weight-%, or 80 weight-%, or 82.5 weight-%, or 85 weight-%, or 87.5 weight-%, based on the total weight of the composite composition.

In one embodiment, the composite composition comprises magnetic filler material in an amount of 10-70 volume-%, or 30-60 volume-%, or 45-55 volume-% based on the total volume of the composite composition.

In one embodiment, the composite composition comprises magnetic filler material in an amount of at least 60 weight-%, or at least 75 weight-%, or at least 80 weight-%, or at least 82.5 weight-%, or at least 85 weight-%, or at least 87.5 weight-%, based on the total weight of the composite composition. In one embodiment, the composite composition comprises a magnetic filler material in an amount of 40-95 weight-%, 75-91.3 weight-%, or 85-90 weight-% based on the total weight of the composite composition.

In one embodiment, the magnetic filler material is selected from a group consisting of hard magnetic materials and soft magnetic materials.

As used herein, the term "hard magnetic material" refers to materials that retain their magnetism after being magnetized. The term "permanent magnet" may also be used synonymously to "hard magnetic material". The selection of the hard magnetic material depends on the magnetic properties required by the intended application; for example, the required temperature stability.

In one embodiment, the hard magnetic material is selected from a group consisting of Nd, $Nd_2Fe_{13}CoB$, $Nd_7Fe_4B_3$, $Fe_xO_ySr_z$, $Ba_xFe_yO_z$, $SmCo_5$, $Sm_2Co_7$, $Sm_2Co_{17}$, $Fe_2O_5Sr_2$, $SrFeO_2$, $SrFeO_3$, $SrFe_{12}O_{19}$, $BaFe_{12}O_{19}$, other hard ferrites and any mixtures thereof.

As used herein, the term "soft magnetic material" refers to materials that are easily magnetized and demagnetized. The selection of the soft magnetic material depends on the applied surface compatibilization method.

Non-limiting examples of soft magnetic materials include iron, nickel, other transition metals, or mu-metal as well as alloys of the above.

In one embodiment, the soft magnetic material is selected from the group consisting of $Fe_3O_4$, Fe, Ni, Co, mu-metal (such as $Ni_{77}Fe_{17}Cu_5Mo$, $Ni_{76}Fe_{17}Cu_5Cr_2$, or $Ni_{81}Fe_{16}Mo_3$), $Ni_4Fe$, $Ni_3Fe$, CoNi, $Co_2Ni_3$, $Co_3Ni_2$, $Co_4Ni$, FeCo, $Fe_7Co_3$, $Fe_{51}Co_{49}$, $Fe_{51}CO_{47}V_2$, $Co_8FeNi$, $NiFe_2O_4$, $CoFe_2O_4$, $MnZnFe_4O_8$, or $NiZnFe_4O_8$. In one embodiment, the soft magnetic material is $Fe_3O_4$.

As used herein, the term "mu-metal" refers to a soft ferromagnetic nickel-iron alloy. Mu-metal may be e.g. ASTM A753 Alloy 4 comprising approximately 77% nickel, 16% iron, 5% copper, and 2% chromium or molybdenum, or other suitable composition known to a person skilled in the art.

In one embodiment, the surface treatment is a plasma treatment or supercritical fluid treatment and the soft magnetic material is selected from a group consisting of Fe, Co, Ni, mu-metal (such as $Ni_{77}Fe_{17}Cu_5Mo$, $Ni_{76}Fe_{17}Cu_5Cr_2$, or $Ni_{81}Fe_{16}Mo_3$), $Ni_4Fe$, $Ni_3Fe$, CONi, $Co_2Ni_3$, $Co_3Ni_2$, $Co_4Ni$, FeCo, $Fe_7Co_3$, $Fe_{51}Co_{49}$, $Fe_{51}Co_{47}V_2$, $Co_8FeNi$, $NiFe_2O_4$, $CoFe_2O_4$, $MnZnFe_4O_8$, or $NiZnFe_4O_8$.

In one embodiment, the surface treatment is coating the magnetic filler material with a complexing agent and the soft magnetic material is selected from a group consisting of an alloy where the oxidation state of iron is +II or +III, or where both +II and +III are present, e.g. $Fe_3O_4$, Fe, Ni, Co, mu-metal (such as $Ni_{77}Fe_{17}Cu_5Mo$, $Ni_{76}Fe_{17}Cu_5Cr_2$, or $Ni_{81}Fe_{16}Mo_3$), $Ni_4Fe$, $Ni_3Fe$, CONi, $Co_2Ni_3$, $Co_3Ni_2$, $Co_4Ni$, FeCo, $Fe_7Co_3$, $Fe_{51}Co_{49}$, $Fe_{51}Co_{47}V_2$, $Co_8FeNi$, $NiFe_2O_4$, $CoFe_2O_4$, $MnZnFe_4O_8$, or $NiZnFe_4O_8$. Especially when using an agent that complexes with the metal via an amine group (or agent with only one complexing group), the soft magnetic material can also be Co, FeCo, $Fe_7Co_3$, $Fe_{51}Co_{49}$, $Ni_4Fe$, $Ni_3Fe$, CoNi, $Co_2Ni_3$, $Co_3Ni_2$, $Co_4Ni$, $Ni_{81}Fe_{16}Mo_3$, $Co_8FeNi$, $Fe_{51}Co_{47}V_2$. In one embodiment, the soft magnetic material is selected from the group consisting of $Fe_3O_4$, $NiFe_2O_4$, $CoFe_2O_4$, $MnZnFe_4O_8$. In one embodiment, the soft magnetic material is $Fe_3O_4$.

The surface treated magnetic filler material is mixed with a resin to form a composite composition. In one embodiment, the resin comprises or consists of a thermosetting resin or a thermoplastic resin. The resin can be thermoplastic (e.g., polypropylene, polyethylene, polyamide such as Nylon-12, thermoplastic polyimide, polyether imide, polyether ether ketone, polyphenylene sulfide, thermoplastic polyurethane, thermoplastic polyester, thermoplastic acrylic, polyolefin, polycarbonate, phenyl formaldehyde, fluorosilicone, polyvinyl chloride, polyvinylidene chloride, or a copolymer or combination of two or more of the above), or thermoset (e.g. epoxy or other polyepoxide, silicone, polyol such as $C_{12}H_{20}O_6$, thermoset polyurethane, vinyl ester, phenoplast, aminoplast, thermoset acrylic, melamine, thermoset polyimide, thermoset unsaturated polyester, thermoset saturated polyester, or a copolymer or combination of two or more of the above).

The epoxy resin may be selected from a group containing diglycidyl ether of bisphenol A or F, novolac-type epoxies, cycloaliphatic epoxy such as 3,4-epoxycyclohexylmethyl 3,4-epoxycyclohexylcarboxylate, a diepoxide in which the two epoxy groups are connected via an acyclic acetal group, e.g. acetaldehyde bis-(3,4-cyclohexylmethyl)diepoxide, diglycidyl ether of tetrabromobisphenol A, hydroquinone, (poly)ethylene glycol, (poly)propylene glycol, butylene glycol, polytetramethylene glycol, 1,4-butanediol, 1,6-hexanediol, cyclohexanedimethanol, resorcinol, neopentyl glycol, bisphenol A polyethylene glycol, bisphenol A polypropylene glycol, tetraglycidyl methylene dianiline, tetraglycidyl ether of pentaerythritol, diglycidyl ester of terephthalic acid, poly(glycidyl acrylate), poly(glycidyl methacrylate), epoxidized polyunsaturated fatty acids, epoxidized vegetable oils, epoxidized fish oils, epoxidized limonene, epoxidized polybutadiene, and any mixture thereof.

In one embodiment, allowing the composite composition to cure comprises subjecting the composite composition to exposure to a hardener, heating, irradiation with UV or visible light, or exposure to a solvent. If the composite is allowed to cure by subjecting it to heating, heating may be accomplished in one of several ways. Non-limiting examples of ways to accomplish heating of the composite composition are convection, radiation such as infrared/microwaves, contact with a heated mold, electromagnetic induction, or plasma.

In one embodiment, the method comprises annealing the composite structure after having allowed the composite composition to cure.

In one embodiment, the method comprises exposing the composite composition to vacuum prior to allowing the composite composition to cure to remove gas bubbles therefrom. In one embodiment, the gas which is removed from the composite composition is air, volatile components from the uncured composite composition, solvent vapors, or any mixture thereof.

In one embodiment, the composite composition is subjected to molding prior to allowing the composite composition to cure. The purpose of the molding is to form the composite composition to its desired final shape.

In one embodiment, the composite composition is subjected to injection molding or compression molding prior to allowing the composite composition to cure. The purpose of the injection molding or the compression molding is to form the composite composition to its desired final shape.

In one embodiment, the molten composite composition comprising thermoplastic material is subjected to injection molding or compression molding prior to allowing the composite composition to cure simultaneously as it cools down. The purpose of the injection molding or the compression molding is to form the composite composition to its desired final shape. In one embodiment, the composite composition comprising thermoplastic material is pelletized before being subjected to injection molding or compression molding. In one embodiment, the molten composite composition may be extruded to form a filament which may be suitable for use e.g. in 3D-printing applications.

In one embodiment, the magnetic filler material is selected from a group consisting of magnetic particles, magnetic fibres, pyrolytic graphite, and any combination or mixture thereof.

In one embodiment, the magnetic particles are of spherical, elliptical, rod-like, plate-like, dumbbell-like, or undefined shape. In one embodiment, the magnetic particles are magnetically modified fibres such as carbon fibres or glass fibres with magnetic modification on the surface, in the pores, or in the lumen in the case of hollow fibres.

The magnetic modification can be accomplished through deposition of magnetic particles or nanoparticles in different shapes (e.g. spherical, elliptical, rod-like, plate-like, dumbbell-like or undefined shape) or a continuous or partly continuous coating. A surface treatment, such as coating or plasma treatment or their combination, can be applied on the filler in order to ensure adhesion with the plastic resin.

The diameters of at least 90% of the magnetic particles are between 0.5 μm and 200 μm as determined by sieves. In one embodiment, the diameters of at least 90% of the magnetic particles are between 0.5 μm and 150 μm. In one embodiment, 0.5 μm-20 μm. In one embodiment, the diameters of at least 90% of the magnetic particles are between 0.5 μm-10 μm. In one embodiment, the diameters of at least 90% of the magnetic particles are between 0.5 μm-5 μm.

The magnetic filler material (obtained after possible solvent exchange, and/or additional coating, and/or drying) is mechanically mixed or kneaded into the resin in its melted (for thermoplastics) or liquid, unhardened (for thermosets) state. In the case of a thermoplastic matrix, the dry filler or filler suspension can also be mixed with solid pellets of the thermoplastic.

In one embodiment, the composite composition comprises resin in an amount of 15-90 volume-%, or 2.5-60 weight-% based on the total amount of the composite composition.

In one embodiment, the composite composition comprises up to 80 weight-% of additional additives selected from a group consisting of reinforcements, tougheners, hardeners, softeners, thermoplastic filler to prompt self-healing, metal chelators to increase the magnetic performance of the composite, and any combinations thereof. The additional additives can be added to the resin before or after adding the magnetic filler.

In one embodiment, the composite composition comprises up 50% of a hardener, and up to 60% of additional additives selected from a group consisting of reinforcements, tougheners, softeners, thermoplastic filler to prompt self-healing, metal chelators to increase the magnetic performance of the composite, and any combinations thereof.

In one embodiment, when preparing a thermoset resin, the hardener is selected from a group consisting of anhydrides such as glutaric anhydride, phthalic anhydride, methyltetrahydrophthalic anhydride, hexahydrophthalic anhydride, tetrahydrophthalic anhydride, methyltetrahydrophthalic anhydride, methylhexahydrophthalic anhydride (e.g. hexahydro-4-methylphthalic anhydride), dodecenyl succinic anhydride, nadic anhydride, methyl nadic anhydride, trimellitic anhydride, maleic anhydride, pyromellitic dianhydride, benzophenone tetracarboxylic dianhydride, ethylene glycol bistrimellitate, glycerol tristrimellitate, endomethylene tetrahydrophthalic anhydride, methylendomethylene tetrahydrophthalic anhydride, methylbutenyl tetrahydrophthalic anhydride, succinic anhydride, methylcyclohexene dicarboxylic anhydride, (alkyl) styrene-maleic anhydride copolymer, chlorendic anhydride, polyazelaic polyanhydride, amines containing at least two amino groups, such as 3-aminomethyl-3,5,5-trimethylcyclohexylamine (i.e., isophoronediamine), polyoxypropylenediamine m-phenylenebis(methylamine), 4-methylcyclohexane-1,3-diamine, 2-methylcyclohexane-1,3-diamine, diethylene triamine, triethylene tetramine, tetraethylene pentamine, dipropylene triamine, diethylamino propylamine, N-aminoethylpiperazine, isophoronediamine, xylylenediamine, metaphenylene diamine, diaminodiphenylmethane, diaminodiphenylsulfone polyamides, polyphenols, organic acids, isocyanates, polymercaptans, and any mixtures thereof.

In one embodiment, the additional additives are selected from a group consisting of 4-tert-butylphenol, 5-amino-1,3,3-trimethyl cyclohexanecarbonitrile, Imidazoles such as 1-methylimidazole, 2-methylimidazole, 5-methylimidazole, 4-methylimidazole, 2-ethylimidazole, 2-ethyl-4-methylimidazole, 1-cyanoethyl-2-undecylimidazolium trimellitate or an epoxy-imidazole adduct (accelerator or co-curing agent), tertiary or secondary amines (accelerator or co-curing agent), transesterification catalysts, such as a metal (salt), sulfuric acid, hydrochloric acid, phosphoric acid, NaOH, KOH, carbonate, alkoxide, benzyldimethylamide, benzyltrimethylammonium chloride, Boric-acid esters, Lewis acids, organic metal compounds, organic metal salts, and mixtures thereof. When using a resin with ester or hydroxyl functions and an acid anhydride hardener, a transesterification catalyst may be used in order to improve the recyclability of the cured resin system.

In one embodiment, the composite composition may comprise other fillers e.g., reinforcements such as carbon fibers, carbon nanofiber, glass fibers, glass nanofibers, ceramic fibers, ceramic nanofibers, aramid fibers, aramid nanofibers, alumina fibers, alumina nanofibers, or any mixture thereof, tougheners such as ceramic particles or silicon particles, or metal chelators to increase the magnetic performance and filler-resin adhesion). These other or additional filler may be incorporated in the composite composition by mixing them with the resin system before, during or after the mixing with the magnetic fillers. A solvent or several can be added as a carrier for any or several of the additives. During or after mixing or both, the resin system can be exposed to vacuum in order to remove gas bubbles and possible solvent introduced with the magnetic and/or other filler(s). The gas bubbles removed may be air, other gases, or mixtures of gases.

If a thermoset resin is used in the composite composition, it may be cured into a chemical composition including cleavable bonds. This allows recycling after use, potentially so that both the resin and fillers can be recovered for reuse. Non-limiting examples of thermoset resins that are recyclable include epoxy resin with an amine-containing hardener, which form bonds that are cleavable under acidic conditions, epoxide or hydroxyl group-containing resin combined with acid anhydride or other ester-containing hardener, which undergo reversible transesterification, tetrafunctional diepoxide resin, where the epoxide groups are connected through a cleavable bond (such as an acetal group), with difunctional cyclic anhydride hardener, and a combination of furan- and maleimide-containing components, which undergo reversible Diels-Alder reaction. The hardeners resulting in a cured composite composition comprising cleavable chemical bonds may also be referred to as "dynamic hardeners".

Several resin matrices allowing intrinsic recyclability are known to a person skilled in the art. Recycling thermoplastics by re-melting is already well established. In addition, recyclable thermoset resins have been reported. Recycling can be done e.g. by reprocessing or recovery and reuse in a new material. When recycling, the composite structure may first be shredded and may then be exposed to the appropriate trigger (e.g. temperature or solvent) required to cleave it or transfer it into a re-moldable form. Subsequently, the composite structure can be dissolved or melted, and the magnetic filler materials separated from the dismantled resin matrix with a magnet or by filtration. Possible other fillers can also be separated or stay mixed with the resin. Alternatively, the resin system and magnetic fillers can stay mixed and just be re-processed into a new form.

A composite structure comprising magnetic filler material obtained by the method described herein can be formed into the desired shape through known processing techniques used for forming or shaping plastic or composite materials. If the resin matrix is thermoplastic, the composite composition may be formed or shaped by injection molding or compression molding. As is known to a person skilled in the art, the choice of molding method will depend on many factors such as the consistency of the composite composition. Additional fillers (e.g., reinforcements such as carbon, glass, aramid, or alumina fibers or nanofibers, tougheners such as ceramic particles or silicon particles, or thermoplastic fillers such as poly(ethylene-co-methacrylic acid), poly(ethylene-co-glycidyl) methacrylate and ethylene vinyl acetate to prompt repairability and/or self-healing) can be added during the processing stage, e.g. by using the magnetically loaded composite composition as the plastic or resin component in techniques that involve addition of fibers, such as filament winding, pultrusion or resin transfer molding. If the filler is a continuous fiber, it can itself be processed with techniques like filament winding, pultrusion or resin transfer molding, using a resin with or without magnetic loading. Before processing into the final shape, the magnetically loaded composite composition can be made into a prepreg containing magnetic fibers, combination of magnetic particles and magnetic fibers or a combination of magnetic particles and non-magnetic fibers.

After forming into the final shape, the attained composite composition may be cured according to a procedure that is suitable for the applied resin to form the composite structure. The composite composition or composite structure can also be annealed at elevated temperature in order to improve its magnetic properties.

The composite can be cooled before and/or after the curing and/or after the annealing. The cooling can be done rapidly by immersing the composite or its container in liquid nitrogen or more slowly by refrigeration or freezing.

The composite can be pressed at least 400 MPa, or at least 500 MPa, or at least 600 MPa during and/or after curing and/or annealing. If the pressing is conducted after the curing and/or annealing, the sample can be exposed to the pressure while still hot and/or after cooling, for a total time of at least 15 min, or at least 20 min, or at least 25 min, or at least 30 min or as long as the curing, annealing, and/or cooling takes.

If the composite structure needs to be joined together with other composite parts with similar resin but different composition, these parts can be fused together by applying heating and pressure if their resin is thermoplastic or thermoset with a hardener that allows reprocessing. If the resin is thermoset, the parts can be joined together before curing in order for them to be fused together upon curing.

In one embodiment, the composite structure disclosed herein is used in applications requiring lightweight materials with magnetic properties and resistance to mechanical fatigue.

The composite structure disclosed herein and/or produced using the method disclosed herein is useful in applications requiring magnetic activity combined with low weight and/or effective junction between magnetic and composite parts. Examples include devices with active magnetic bearings (e.g., flywheels, turbogenerators and other rotating electrical machines), electromagnetic actuators applying force on composite parts as well as magnet-powered mobility systems, such as Hyperloop.

The method described in the current specification has the added utility of having properties suitable for the production of a magnetically loaded composite composition suitable for use in applications requiring lightweight materials with magnetic properties and resistance to mechanical fatigue.

In one embodiment, a composite structure produced according to the method of the present disclosure or a composite structure according to the present disclosure may withstand a tensile strength of 0.2% strain for 10 000 cycles without breaking. In one embodiment, the composite structure can withstand a tensile strength of 0.5% strain for 200 000 cycles without breaking. Previously, 45-vol-% loaded magnetic composites have been reported to fracture already after 17 cycles of up to 1% tensile strain, whereas neat epoxies can last even 1 000 000 cycles of cyclic stresses. As used herein, tensile strain means the length of an object in stretched state divided by its original length multiplied by 100%.

LIST OF THE FIGURES

In the following, the invention is presented in detail by referring to the attached drawings, where:

Figure 12:
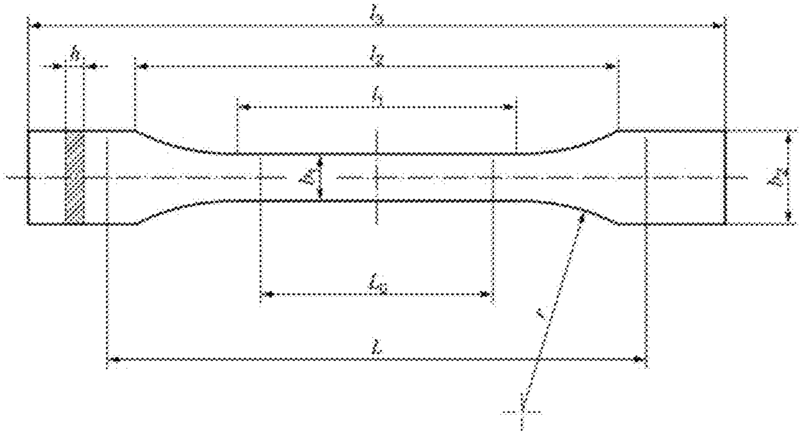
Figure 13:
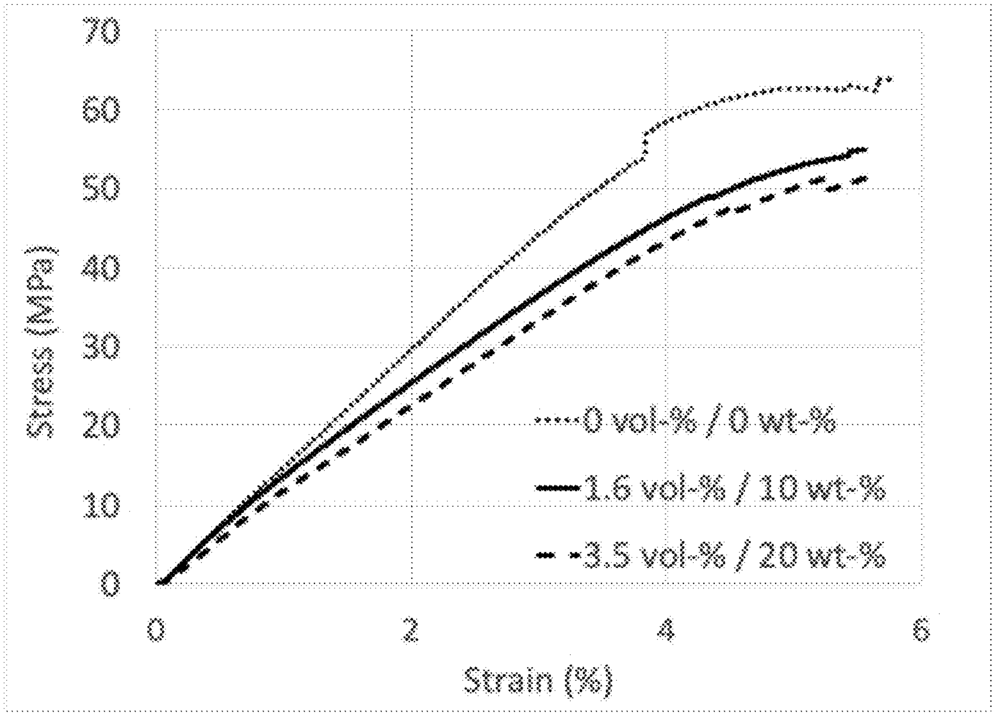
Figure 14:
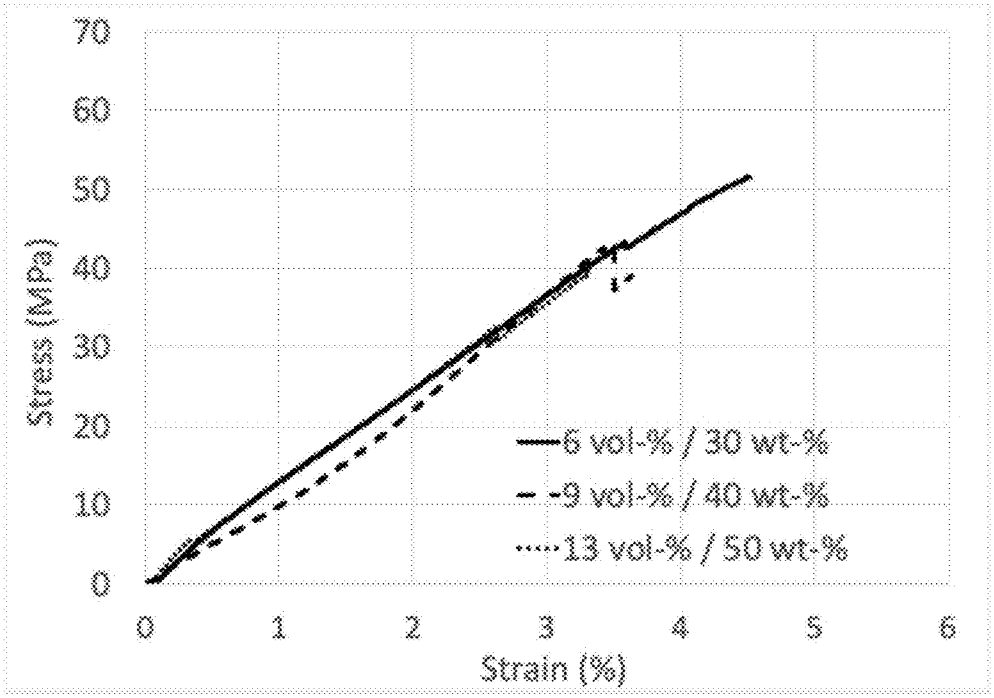

FIGS. 12-14 present the average stress-strain curves for carbonyl iron particles in DGEBA at varying loadings.

Figure 15:
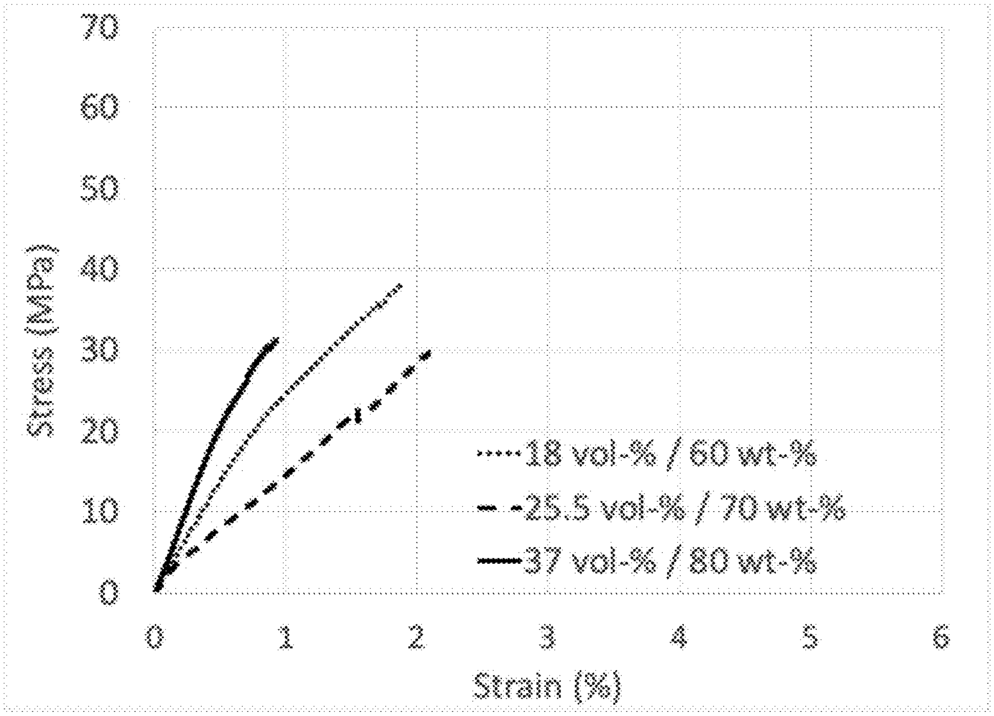

FIG. 15 shows the average stress-strain curves for carbonyl iron particles in DGEBA (example 1.2).

Figure 16:
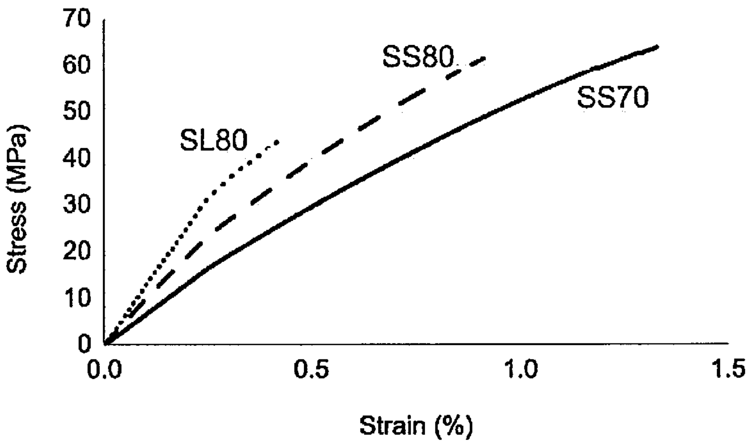

FIG. 16 shows the average stress-strain curves for elastomer-containing matrix without (Ref, solid line) and with (Fe75, dashed line) 75 wt-%/30 vol-% carbonyl Fe particles.

Figure 17:
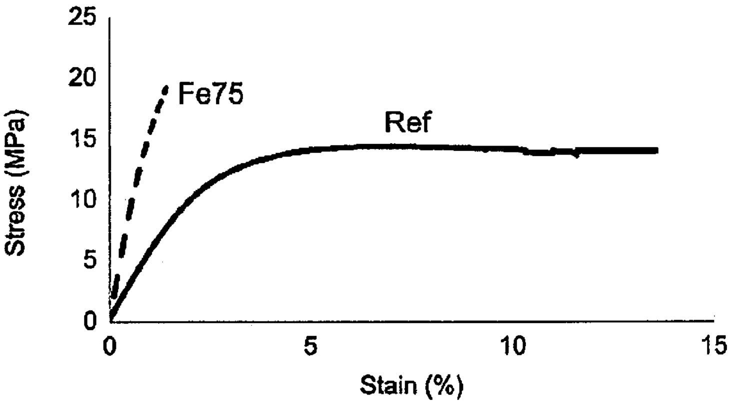

FIG. 17 shows the average stress-strain curves for elastomer-containing matrix with varying loadings of carbonyl Fe particles (example 1.3.

Figure 18:
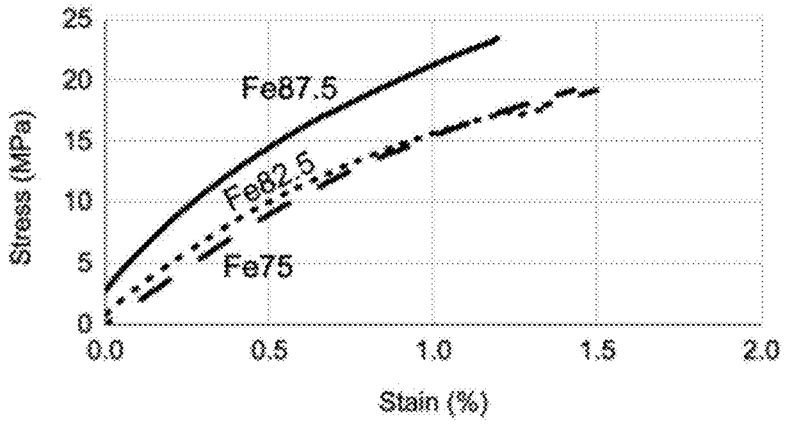

FIG. 18 shows the average stress-strain curves for NdFeCoB particles in DGEBA (example 1.4).

Figure 19:
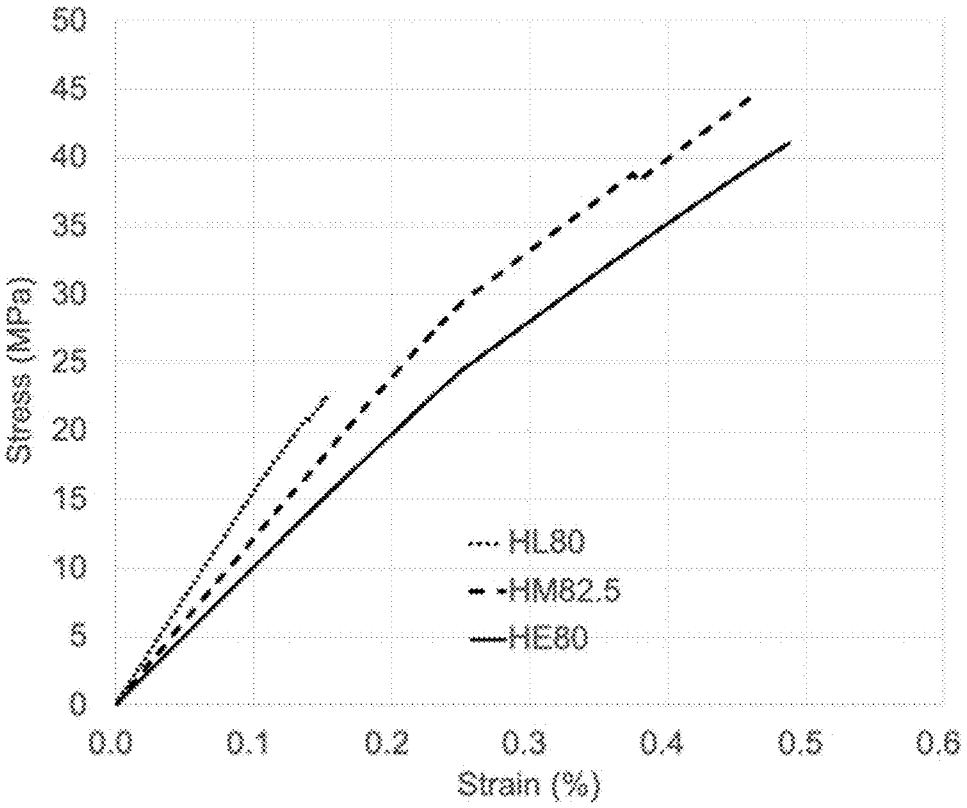

FIG. 19 shows the average stress-strain curves for elastomer-containing matrix with varying loadings of NdFeCoB particles (example 1.5).

DETAILED DESCRIPTION OF THE INVENTION

Reference will now be made in detail to various embodiments. The description below discloses some embodiments in such a detail that a person skilled in the art is able to utilize the embodiments based on the disclosure. Not all steps or features of the embodiments are discussed in detail, as many of the steps or features will be obvious for the person skilled in the art based on this specification.

Example 1—Preparing Magnetic Composite Composition

Figure 1:
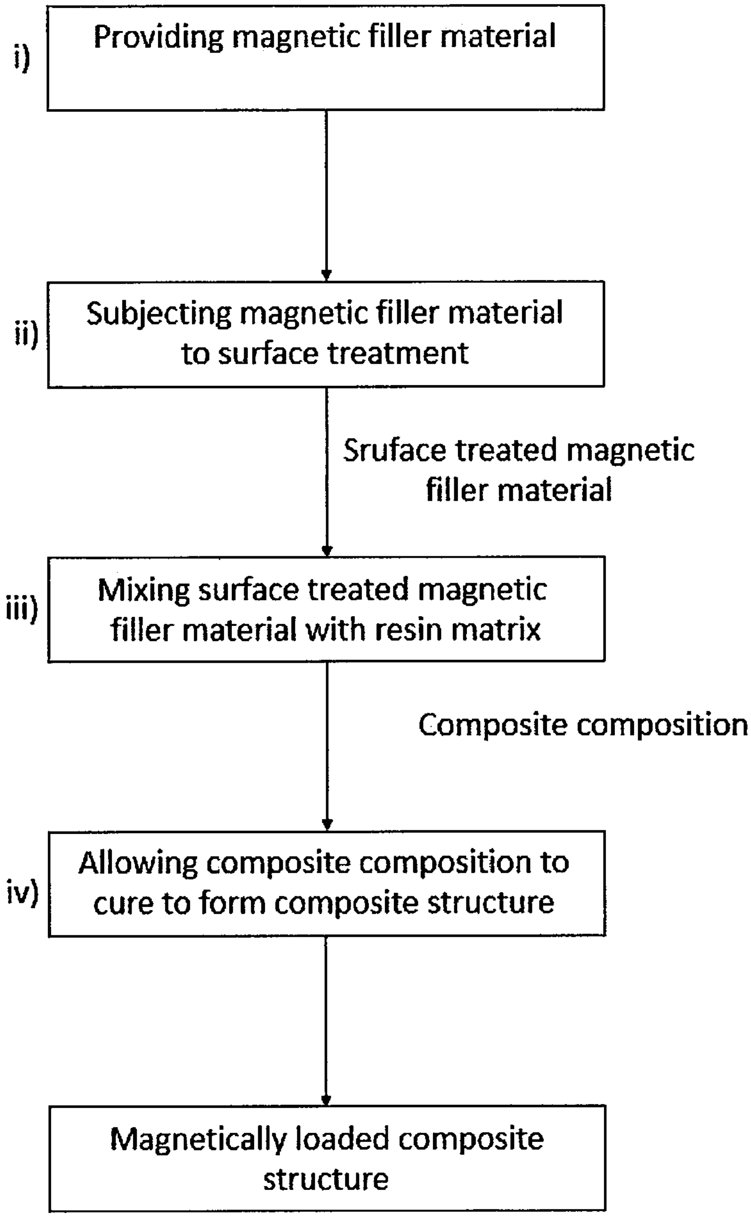
FIG. 1 shows a flow chart of one embodiment of the method for producing a composite structure.

The process applied for producing the composite structures in this example is outlined in FIG. 1.

1.1 Carbonyl Iron Fillers in DGEBA Resin 1

100 g of Sika Biresin CR83 was manually mixed with 30 g of Sika Biresin CH83-6 hardener (modified polyamine). The total 130 g of the resin mixture was exposed to vacuum for approx. a minute in order to get the moisture and majority of the air bubbles out. The mixture was divided into two smaller pots (65 g+65 g) to prevent the exothermic reaction from escalating. The two 65 g pots were heated in oven for 55 min at 50° C. to reach a suitable viscosity.

Carbonyl iron particles (spherical, diameter 5-9 μm as determined by sieves) were mixed with the epoxy mixture in correct amounts to attain a set of loadings specified in Table 1. Volumetric percentages refer to fractions in the cured composite and are calculated assuming a particle density of 7.9 g/cm$^3$ and cured epoxy density of 1.2 g/cm$^3$.

TABLE 1

| Sample | Epoxy weight-% | Particles weight-% | Epoxy volume-% | Particles volume-% |
|---|---|---|---|---|
| Ref | 100 | 0 | 100 | 0 |
| Fe10 | 90 | 10 | 98.4 | 1.6 |
| Fe20 | 80 | 20 | 96.5 | 3.5 |
| Fe30 | 70 | 30 | 94.1 | 5.9 |
| Fe40 | 60 | 40 | 91.1 | 8.9 |
| Fe50 | 50 | 50 | 87.2 | 12.8 |
| Fe60 | 40 | 60 | 82.0 | 18.0 |
| Fe70 | 30 | 70 | 74.5 | 25.5 |
| Fe80 | 20 | 80 | 63.1 | 36.9 |

The powder-epoxy mixtures were manually mixed for 10 min to attain a visually homogenous mixture. The attained mixtures were poured to silicon molds. Possible air bubbles were removed from the bottom edge of the mold by following the edge with a thin metal needle. The extra resin was removed from the samples by sweeping the surface of the mold by a metal plate. This resulted in an equal amount of resin in each sample. The molded samples were initially cured for 24 h at room temperature in the mold, followed by final curing out of the mold at 70° C. for 5 h.

1.2 Carbonyl Iron Fillers in DGEBA Resin 2

Sika Biresin CR144, anhydride hardener HY 917 and imidazol accelerator Huntsman DY070 were mixed in 100:88.77:1.8 wt:wt:wt ratio as follows: First the resin was exposed to vacuum to make sure that all the air was removed. The hardener was added and mixed for 25 min with a dispersion disk under vacuum. The accelerator was then added, and the vacuum mixing continued for 5-10 min. After that, carbonyl iron particles were added in alternative sizes and loadings specified in Table 2. Volumetric percentages refer to fractions in the cured composite and are calculated assuming a particle density of 7.7 g/cm3 and cured epoxy density of 1.2 g/cm3. The particle size indicated in Table 2 refers to the size of a sieve through which at least 80% of the particles can pass.

TABLE 2

| Particle fraction (wt %) | Resin fraction (wt %) | Particle fraction (vol %) | Resin fraction (vol %) | Particle size as determined by sieves Small: 5 μm | Medium: 44 μm | Large: 150 μm |
|---|---|---|---|---|---|---|
| 60 | 40 | 18.0 | 82.0 | Sample SS60 | Sample SM60 | Sample SL60 |
| 70 | 30 | 25.5 | 74 5 | Sample SS70 | Sample SM70 | Sample SL70 |
| 80 | 20 | 36.9 | 63.1 | Sample SS80 | Sample SM80 | Sample SL80 |

The particle size distribution of the small particles, determined by sieves, is as follows (percentages signify the proportion of particles below the indicated diameter in μm):

10%=2.078, 20%=2.570, 30%=2.943, 40%=3.288, 50%=3.641, 60%=4.033, 70%=4.507, 80%=5.151, 90%=6.260, and 95%=7.485.

The particle size distribution of the medium particles, determined by sieves, is as follows (percentages signify the proportion of particles below the indicated diameter in μm): 10%=15.69, 20%=21.26, 30%=25.34, 40%=28.75, 50%=31.95, 60%=35.20, 70%=38.92, 80%=43.69, 90%=51.71, and 95%=60.35.

After adding the particles, the vacuum mixing was continued for 10-20 min. The obtained dispersions were molded into plates in glass molds. The samples were placed in an oven preheated to 60° C. and cured according to the following program:

1. Heating from 60 to 90° C. at a ramp of 0.3° C./min,
2. 4 h at 90° C.,
3. Heating from 90 to 105 deg C. at a ramp of 1° C./min,
4. 2 h at 105° C.,
5. Heating from 105 to 140 at a ramp of 1° C./min, and
6. 4 h at 140° C.

Once the samples had cured, the sample shapes needed for testing were cut out of the cured plate.

1.3 Carbonyl Iron Fillers in Elastomer-Containing Resin

West System G/flex 650-8 components A and B were manually mixed in a 1:1 vol/vol (1.2:2 w/w) ratio. The resin mixture was exposed to vacuum for approx. a minute or not. (Both vacuumed and non-vacuumed samples were tested and no significant difference found in mechanical performance.)

Carbonyl iron particles (spherical, diameter <10 μm as determined by sieves) were mixed with the epoxy mixture in correct amounts to attain a set of loadings specified in Table 3. Volumetric percentages refer to fractions in the cured composite and are calculated assuming a particle density of 7.8 g/cm$^3$ and cured epoxy density of 1.1 g/cm$^3$.

TABLE 3

| Sample | Epoxy weight-% | Particles weight-% | Epoxy volume-% | Particles volume-% |
|---|---|---|---|---|
| Ref | 100 | 0 | 100 | 0 |
| Fe75 | 25 | 75 | 70 | 30 |
| Fe82.5 | 17.5 | 82.5 | 60 | 40 |
| Fe87.5 | 12.5 | 87.5 | 50 | 50 |

The powder-epoxy mixtures were manually mixed until attaining a visually homogeneous mixture. The ensuing mixtures were manually pushed to silicon molds. The molded samples were cured for 24 h at room temperature in the mold.

1.4 NdFeCoB Fillers in in DGEBA Resin

Sika Biresin CR144, anhydride hardener HY 917 and imidazol accelerator Huntsman DY070 were mixed with a dispersion disk under vacuum. NdFeCoB (26.4% Nd, 67.6% Fe, 5% Co, 1% B) plate-like particles were added in alternative sizes and loadings specified in Table 4 and the dispersion mixing under vacuum was continued. Volumetric percentages refer to fractions in the cured composite and are calculated assuming a particle density of 7.6 g/cm$^3$ and cured epoxy density of 1.2 g/cm$^3$.

TABLE 4

| Particle fraction (wt %) | Resin fraction (wt %) | Particle fraction (vol %) | Resin fraction (vol %) | Particle size | | | |
|---|---|---|---|---|---|---|---|
| | | | | Small (D50 = 5 μm) | Medium (D50 = 25 μm) | Medium-large epoxy-coated (D50 = <250 μm) | Large (D50 = <420 μm) |
| 60 | 40 | 18.5 | 81.5 | Sample HS60 | Sample HM60 | Sample HE60 | Sample HL60 |
| 70 | 30 | 26.1 | 73.9 | Sample HS70 | Sample HM70 | Sample HE70 | Sample HL70 |
| 80 | 20 | 37.7 | 62.3 | Sample HS80 | Sample HM80 | Sample HE80 | Sample HL80 |
| 82.5 | 17.5 | 42.5 | 57.5 | Sample HS82.5 | Sample HM82.5 | Sample HE82.5 | Sample HL82.5 |

Figure 2:
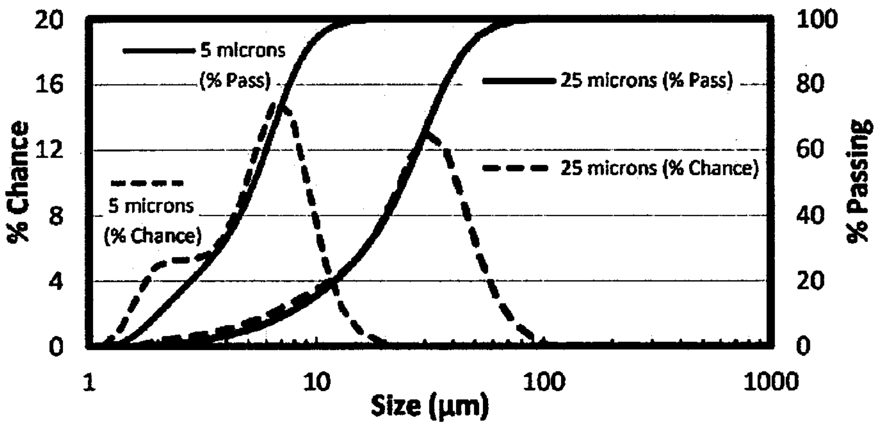
FIG. 2 shows the size distribution of 5 micron and 25 micron particles as determined by sieving.

The particle size distribution of the small and medium-sized particles, determined by sieves, are shown in FIG. 2 (from manufacturer).

Figure 3:
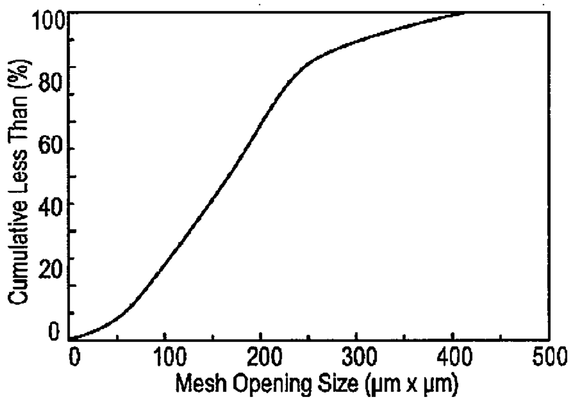
FIG. 3 shows the cumulative size distribution of 200 micron particles as determined by sieve screen analysis.

The particle size distribution of the large particles, determined by sieves, are shown in FIG. 3 (from manufacturer).

The obtained dispersions were molded into plates in glass molds. The samples were cured as in Example 1.1. Once the samples had cured, the sample shapes needed for testing were cut out of the cured plate.

Samples were similarly prepared also out of a corresponding medium-large NdFeCoB with an epoxy coating (coated by manufacturer). Its particle size is specified in the table below. Essentially, most of the particles were between sizes 89-250 μm.

TABLE 5

| Screen Analysis Specification | |
|---|---|
| Total > 60 Mesh (250 × 250 μm opening) | <2 wt-% |
| Total > 170 Mesh (89 × 89 μm opening) | >65 wt-% |
| Total < 270 Mesh (53 × 53 μm opening) | <15 wt-% |
| Total < 325 Mesh (43 × 43 μm opening) | <8 wt-% |

1.5 NdFeCoB Fillers in Elastomer-Containing Resin

West System G/flex 650-8 components A and B were manually mixed in a 1:1 vol/vol (1.2:2 w/w) ratio. NdFeCoB (26.4% Nd, 67.6% Fe, 5% Co, 1% B) particles (plate-like, diameter <420 μm as determined by sieves) were mixed with the epoxy mixture in correct amounts to attain a set of loadings specified in Table 6. Volumetric percentages refer to fractions in the cured composite and are calculated assuming a particle density of 7.6 g/cm$^3$ and cured epoxy density of 1.1 g/cm$^3$.

TABLE 6

| Sample | Epoxy weight-% | Particles weight-% | Epoxy volume-% | Particles volume-% |
|---|---|---|---|---|
| Ref | 100 | 0 | 100 | 0 |
| Nd75 | 25 | 75 | 70 | 30 |

TABLE 6-continued

| Sample | Epoxy weight-% | Particles weight-% | Epoxy volume-% | Particles volume-% |
|---|---|---|---|---|
| Nd82.5 | 17.5 | 82.5 | 60 | 40 |
| Nd87.5 | 12.5 | 87.5 | 50 | 50 |

The powder-epoxy mixtures were manually mixed until attaining a visually homogeneous mixture. The ensuing mixtures were manually pushed to silicon molds. The molded samples were cured for 24 h at room temperature in the mold.

1.6 Plasma-Treated Carbonyl Iron Fillers in Elastomer-Containing Resin 75-90 g batch of carbonyl iron particles (spherical, diameter <10 μm as determined by sieves) was treated for 3 min with air plasma on a petri dish followed by mixing. The treatment and mixing were repeated 5 times to attain a total treatment time of 15 min. Three batches were combined (total weight 251.52 g) and mixed with 36 g pre-mixed G/Flex epoxy mixture (components A and B in a 1:1 vol/vol or 1.2:2 w/w ratio), to attain a particle-epoxy ratio of 1:1 vol/vol or 87.5:12.5 w/w. The particle-epoxy mixture was manually mixed until attaining a visually homogenous mixture. The ensuing mixtures were manually pushed to silicon molds. The molded samples were cured for 24 h at room temperature in the mold.

1.7 Carbonyl Nickel Fillers in DGEBA Resin

Sika Biresin CR131 was manually mixed with Sika Biresin CH135-8 hardener in a 100:21 w/w (100:26 v/v) ratio. Carbonyl nickel powder (spherical, porous particle, diameter <5 μm as determined by sieves) was manually mixed with the epoxy mixture in a 50:50 v/v powder:epoxy ratio. The epoxy-particle mixture was poured into a silicon mould. The samples were cured in the mould, first at room temperature overnight and then at 140° C. for 8 hours.

1.8 $Fe_3O_4$ Fillers in DGEBA Resin

Magnetite ($Fe_3O_4$) particles were prepared by coprecipitation of $Fe^{2+}$ and $Fe^{3+}$ as follows: 12.9 g of anhydrous $FeCl_2$ (102 mmol) and 35.25 g (217 mmol) of anhydrous $FeCl_3$ were dissolved in 600 ml deionized water in order to attain an approx. 1:2 molar ratio of $Fe^{2+}$ and $Fe^{3+}$. The solution was stirred for 45 min at 80° C. Subsequently, 150 ml of 25% ammonia aqueous solution was added under vigorous stirring. Stirring at 80° C. was continued for another 30 min. Finally, 15 g of citric acid mixed with 30 ml water was added to the solution and stirring was continued for 90 min at 95° C.

The particles were washed by centrifugation or dialysis as follows:

Centrifugation: the sample was first centrifuged once, and the supernatant discarded. The precipitate was mixed with deionized water and stirred for 30 min before centrifuging again. The supernatant was discarded, and the precipitate dried in ambient air.

Dialysis: Excess water was decanted off the sample. Subsequently, it was placed in a dialysis tube and dialyzed against deionized water until reaching a pH of 7. After removing the sample from the tube, it was dried in ambient air.

The magnetite particles were embedded in epoxy as follows:

Sika Biresin CR131 was manually mixed with Sika Biresin CH135-8 hardener in a 100:21 w/w (100:26 v/v) ratio. Magnetite particles washed by dialysis were added to attain a 50:50 wt:wt particle:epoxy ratio. The epoxy-particle mixture was poured into a silicon mould. The samples were cured in the mould at 140° C. for 8 hours.

1.9 Magnetite-Coated Carbon Fibre Fillers in Elastomer-Containing Resin

Magnetite electrodeposition on carbon fibre was conducted as follows:

256 mg of recycled carbon fibre veil (grammage 30 g/m$^2$) was cut into 8 pieces of approximately 52 mm×18 mm. The pieces were stacked and connected to the negative pole of a voltage source, while a steel electrode was connected to the positive pole. Both the electrodes were immersed in an aqueous solution of 0.5 M $FeCl_2$ and 0.5 M $FeCl_3$ (pH 1). A voltage of 1.2 V was applied for 2 h.

After the electrodeposition, the pieces weighed 587 mg, implying a 129% increase in mass through addition of 331 mg of magnetite. Part of this was cut off when forming the pieces suitable for embedding, leaving approximately 300 mg of magnetite in the veils that were embedded in elastomer-containing resin as follows:

West System G/flex 650-8 components A and B were manually mixed in a 1.75:1 vol/vol (2.1:1 w/w) ratio. The magnetite-coated carbon fibre veil pieces were dipped in the mixture and manually pressed into a mould and cured overnight at room temperature.

Example 2—Magnetic Properties of Composite Composition

The magnetic properties of the magnetic composite structures prepared according to Examples 1.2 and 1.4 were tested on specimens shaped as plates of 10 mm×10 mm×1 mm, using the Permagraph method. Firstly, the sample is magnetized in an external field. Secondly, the sample is exposed to an opposing external field and its demagnetization measured as a function of the opposing field strength. For soft magnetic composites (example 1.2), a full hysteresis loop was measured, fully inversing the external field followed by returning it to the original one.

The relative magnetic permeability of the soft magnetic composites (example 1.2) was estimated as the approximate maximum slope of the magnetic flux density (B)—magnetic field strength (H) curve. The slope was approximated by dividing the magnetic flux density at a field strength of 100 kA/m with 100 kA/m and the permeability of vacuum.

Figure 4:
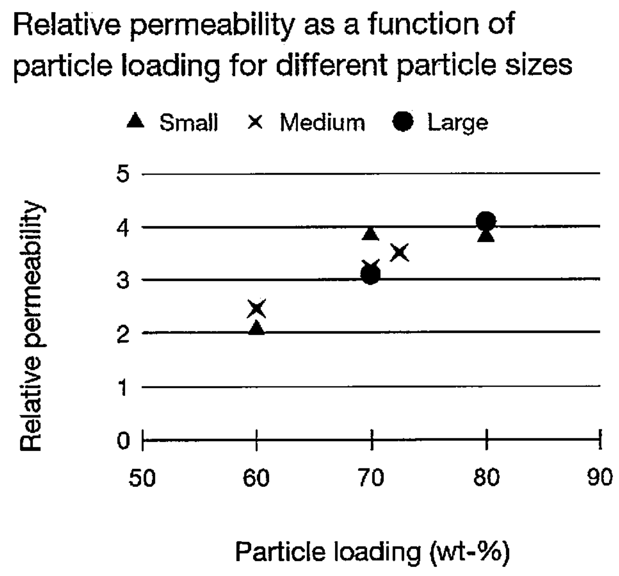
FIG. 4 shows the relative permeability as a function of particle loading for different particle sizes.

The estimated relative permeability as a function of particle loading in the figure below. As seen in FIG. 4, the permeability increased as a function of particle loading, without being much influenced by the particle size. The most permeable samples were obtained with small particles at 70 and 80 weight-% loadings as well as the large particle at 80 weight-% loadings (relative permeability ~4).

Figure 5:
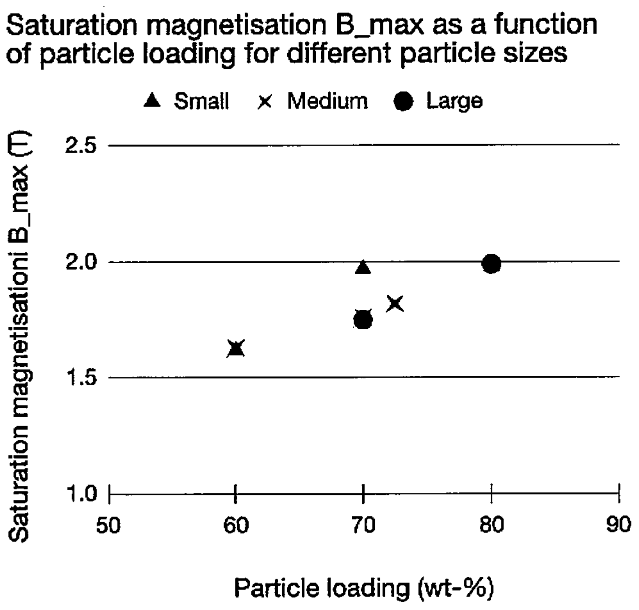
FIG. 5 shows saturation magnetization Bmax as a function of particle loading for different particle sizes.
Figure 6:
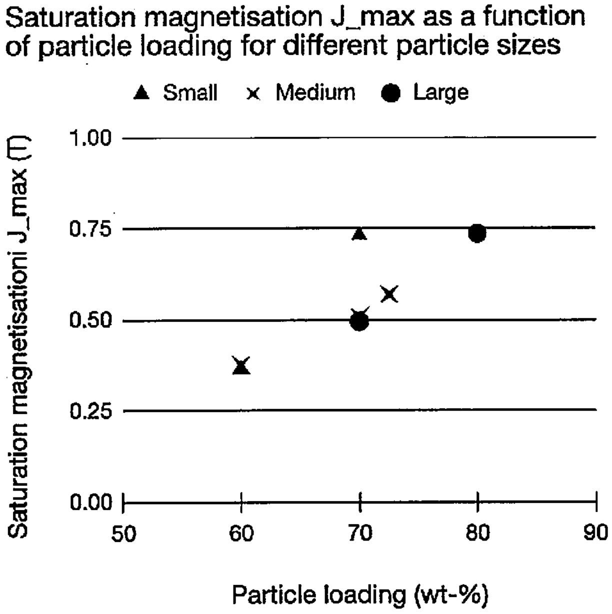
FIG. 6 shows hysteresis losses as a function of particle loading for different particle sizes.

A similar trend was observed in saturation magnetization, which was determined as the largest magnetic flux density attained during the test. The results of the saturation magnetization tests are presented in FIG. 5 and FIG. 6. Note that in FIG. 5 and FIG. 6, data points overlap for small and medium particle at 60 wt-%; for medium and large particle at 70 wt-%; and for small and large particle at 80 wt-%.

Figure 7:
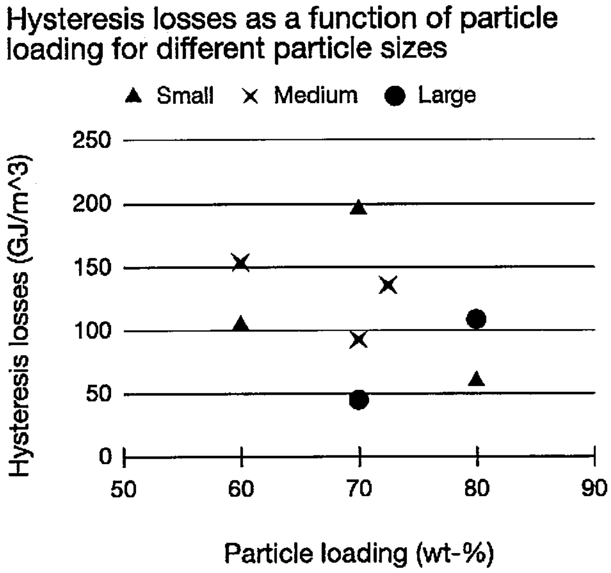
FIG. 7 shows remanence as a function of particle loading for different particle sizes.

The hysteresis losses were calculated as the area inside the hysteresis loop. As seen in FIG. 7, the losses decreased with increasing particle loading, apart from an exception with small particle at 70 weight-% loading with remarkably high losses. The lowest losses occurred with a small particle at a loading of 80 weight-%.

In conclusion, the magnetically best-performing soft magnetic composites (highest permeability, saturation magnetization and lowest hysteresis losses) where attained by using small (80% of particles <5 μm) or large (150 μm) particle with a loading of 80 weight-%.

Figure 8:
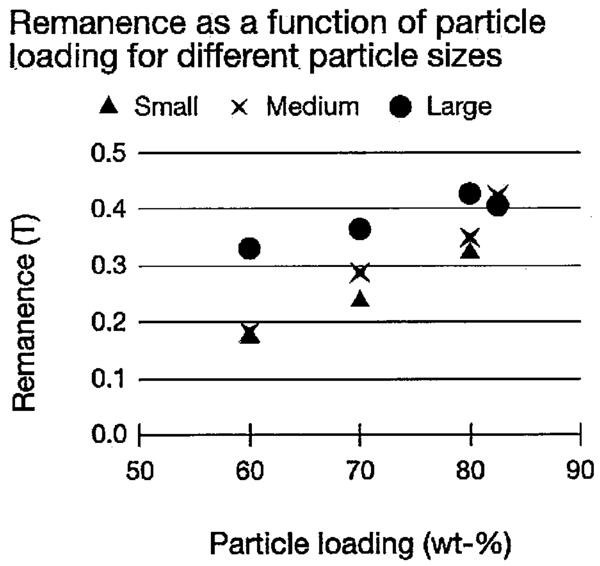
FIG. 8 shows normal coercivity as a function of particle loading for different particle sizes.

The remanence (i.e. residual magnetism) for hard magnetic composites (example 1.4) is presented in FIG. 8. Remanence expresses how much magnetic flux remains in the material after complete removal of the external field and can thus be considered as a measure of the ability of the magnetic material to retain its magnetization. As seen in the figure below, the remanence tends to increase with particle size and loading.

Figure 9:
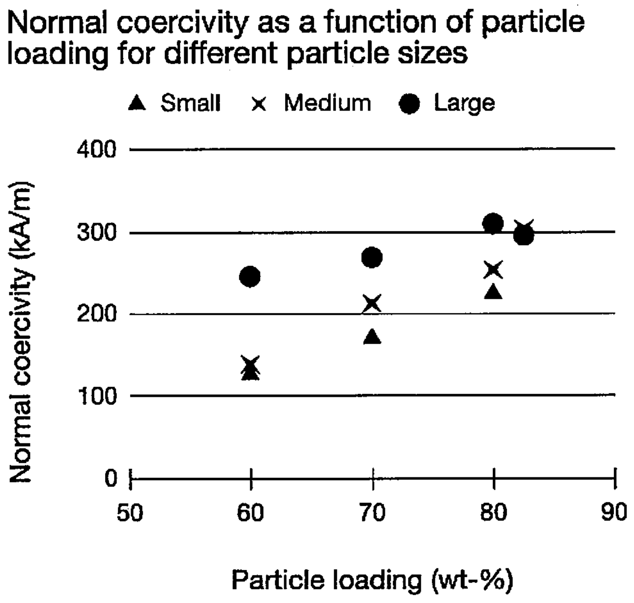
FIG. 9 shows intrinsic coercivity as a function of particle loading for different particles.

A similar trend was observed in normal coercivity. This implied that when the magnetized samples were exposed to an increasing external field opposing their magnetization, the more and the larger particles were included, the larger opposing field was needed to eliminate the total net magnetic field (i.e., superposition of the external field and the sample's own field) The normal coercivity of the samples is presented in FIG. 9.

Figure 10:
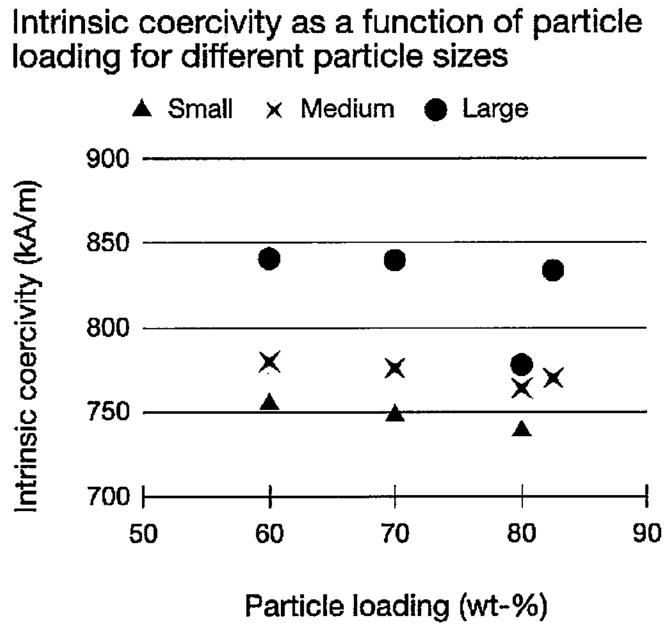
FIG. 10 shows the maximum energy product as a function of particle loading for different particle sizes.

In contrast, the intrinsic coercivity was discovered to be close to independent of particle size and loading, close to 800 kA/m for each sample, apart from a slight drop at a loading of 80 weight-%. This implies that all the samples had close to equal capability to resist demagnetization, see FIG. 10.

Figure 11:
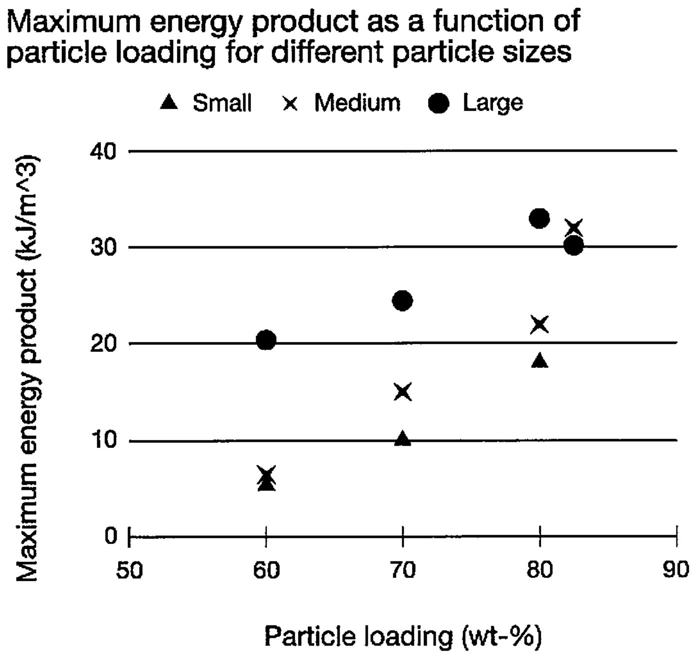
FIG. 11 shows the specimen used for the measurement of tensile properties in Example 3.

Maximum energy product (i.e., the maximum value of the product of magnetic flux density B, in T, and magnetic field strength H, in kA/m) also increased with particle size and loading, as seen in FIG. 11.

In conclusion, the magnetically best-performing hard magnetic composites (highest remanence, normal coercivity and maximum energy product) where attained by using large (up to 420 μm) particles with a loading of 80-82.5 weight-% or medium (median 25 μm) particles with a loading of 82.5 weight-%. For the particle with epoxy coating (end of example 1.4) with a loading of 80 weight-%, the magnetic properties were similar to the best-performing uncoated particles: remanence 0.429 T, normal coercivity 309 kA/m, intrinsic coercivity 788 kA/m and maximum energy product 33.2 kJ/m$^3$.

Example 3—Mechanical Properties of Composite Composition

The tensile strength of the magnetic composite structures prepared according to Example 1 were tested on specimens shaped according to specimen type 1A (for examples 1.1, 1.3 and 1.5) or type 1B (for examples 1.2 and 1.4) in EN ISO 527-2 Plastics. Determination of tensile properties. Part 2: Test conditions for moulding and extrusion plastics. Only the gauge length Lo and the initial distance between grips L differed from the standard, as specified in Table 7. Specimen dimensions are shown in FIG. 12 and table 7 below.

TABLE 7

| Symbol in FIG. 12 | Dimension | Length in mm, examples 1.1, 1.3 and 1.5 | Length in mm, examples 1.2 and 1.4 |
|---|---|---|---|
| $l_3$ | Overall length | 170 | 150 |
| $l_1$ | Length of narrow parallel-sided portion | 80 | 60 |
| r | Radius | 24 | 60 |
| $l_2$ | Distance between broad parallel-sided portions | 109.3 | 108 |
| $b_2$ | Width at ends | 20 | 20 |
| $b_1$ | Width at narrow portion | 10 | 10 |
| h | Thickness | 4 | 4 |
| $L_0$ | Gauge length | 90 | 50 |
| L | Initial distance between grips | 90 | 110 |

Tensile tests were carried out at a temperature of 24° C. and relative humidity of 50%. The gauge length was 90 mm, test speed 1 mm/min and load cell 5 kN (for examples 1.1, 1.3 and 1.5) or 10 N (for examples 1.2 and 1.4). The stress applied on pulling the sample was measured as a function of the tensile strain. (EN ISO 527-2 Type 1B)

Averaged stress-strain curves for soft magnetic composites with DGEBA 1 (example 1.1) are presented in FIGS. 13-15. The plateaus at strains below 0.7% are artefacts due to slippage and not to be considered as part of the curves as seen in these figures, the maximum tensile strain is ~4% or higher for particle loadings up to 50 weight-% (13 volume-%). At 60 weight-%, the max. strain drops to ~2% at 60-70 weight-% (18-25.5 volume-%) and further down to ~1% at 80 weight-% (37 volume-%). As seen in example 2, a composite with nearly similarly sized soft magnetic particle and a loading of 60 weight-% has a relative magnetic permeability of only half of that of a similar composite with 70-80 weight-% loading. Moreover, the saturation magnetization at 60 weight-% was ~20% lower than at 70-80 weight-%. As such, it is preferable to use a loading of 70-80 weight-% (25.5-37 volume-%).

The averaged stress-strain curves of the magnetically best-performing soft magnetic composites with DGEBA 2 (example 1.2) are summarized in FIG. 16. In the figure, sample codes follow Table 2; i.e., S70 and S80 refer to small particle (80% of particles <5 μm) at 70 and 80 wt-% loadings, respectively, and L80 to large particle (150 μm) at 80 wt.-% loading.

As seen in FIG. 16, increasing the particle loading makes the composite stiffer and more brittle. This effect is increased further by enlarging the particle size. Therefore, in order to balance the magnetic properties with mechanical ones, it is preferable to use a small particle. For the small particle, both loadings of 70 and 80 weight-% are satisfactory. However, 80 weight-% (37 volume-%) provides lower magnetic hysteresis losses (see example 2), whereas 70 weight-% (25.5 volume-%) provides more ductility (higher tensile strength maximum tensile strain).

Stress-strain curves for soft magnetic composites with elastomer (example 1.3) are presented in FIGS. 16 and 17. FIG. 17 presents the average stress-strain curves for elastomer-containing matrix without (Ref, solid line) and with (Fe75, dashed line) 75 wt-%/30 vol-% carbonyl Fe particles. FIG. 18 presents the average stress-strain curves for elastomer-containing matrix with varying loadings of carbonyl Fe particles (example 1.3): 75 wt-%/30 vol-% dashed line; 82.5 wt-%/40 vol-% dotted line; 87.5 wt-%/50 vol-% solid line. As seen in FIG. 18, the matrix is highly elastic, and adding magnetic particles in it drops its maximum tensile strain below 8% of the reference sample without particles. When comparing different magnetic particle loadings (FIG. 18), the amount of particles is seen to have little influence on the ductility. Based on the magnetic performance of samples with a different matrix but similar or lower particle loadings (example 2), the samples are all expected to have a satisfactory magnetic performance.

FIG. 19 shows the average stress-strain curves for the magnetically best-performing hard magnetic composites (example 1.4). In FIG. 19, sample codes follow Table 4; i.e., HL80 and HE80 refer to a 80 wt-% loading of large (<420 μm) and medium-large (<250 μm) epoxy-coated particles, respectively, whereas HM82.5 refers a 82.5 wt-% loading of medium (D50=25 μm) particles.

FIG. 19 shows that, even though the large NdFeCoB particle at a loading of 80 weight-% (37.7 volume-%) performs magnetically well, it makes the composite mechanically brittle (HL80 in FIG. 19). The brittleness can be decreased by using a smaller particle with an epoxy coating (HE80 in FIG. 19). Similar improvement can also be attained when decreasing the particle size further (HM82.5 in FIG. 19).

Figure 20:
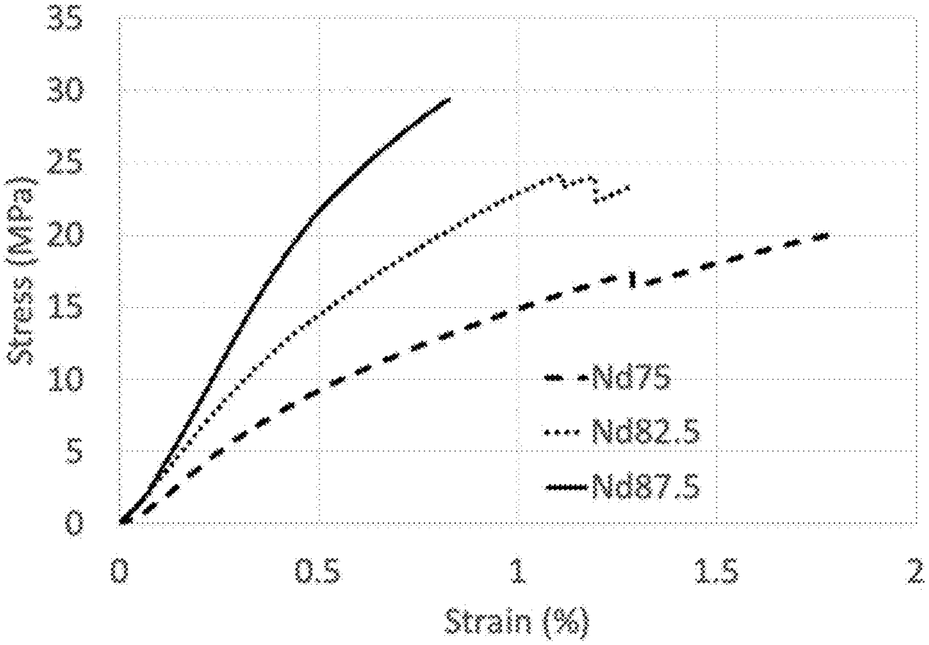

The average stress-strain curves for hard magnetic composites with elastomer (example 1.5) are presented in FIG. 20. In FIG. 20, sample codes follow Table 6. As seen in FIG. 20, when increasing the loading from 30 volume-% (75 weight-%) to 40 volume-% (82.5 weight-%) to 50 volume-% (87.5 weight-%), the max. strain decreases from 2.4% to 1.8% to 1%.

It is obvious to a person skilled in the art that with the advancement of technology, the basic idea may be implemented in various ways. The embodiments are thus not limited to the examples described above; instead they may vary within the scope of the claims.

The embodiments described hereinbefore may be used in any combination with each other. Several of the embodiments may be combined together to form a further embodiment. A method, a composite structure, or a use, disclosed herein, may comprise at least one of the embodiments described hereinbefore. It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items. The term "comprising" is used in this specification to mean including the feature(s) or act(s) followed thereafter, without excluding the presence of one or more additional features or acts.

The invention claimed is:

1. A method for producing a composite structure comprising magnetic filler material embedded in a resin matrix, characterized in that the method comprises:

providing the magnetic filler material, wherein the magnetic filler material is a soft magnetic material;

subjecting the magnetic filler material to a surface treatment for improving the adhesion of the magnetic filler material to the resin matrix in the composite structure, wherein the surface treatment comprises coating of the magnetic filler material;

mixing the surface treated magnetic filler material with the resin to form a composite composition, wherein the composite composition comprises magnetic filler material in an amount of at least 10 volume-% based on the total volume of the composite composition;

exposing the composite composition to vacuum to remove gas bubbles therefrom; and allowing the composite composition to cure to form the composite structure, wherein the magnetic filler material comprises magnetic particles;

wherein the diameter of at least 90% of the magnetic particles is between 0.5 and 20 μm;

wherein the method further comprises mixing an additional filler with the resin before, during or after the mixing of the magnetic filler with the resin;

wherein the composite composition is exposed to vacuum during mixing;

wherein the coating of the magnetic filler material comprises immersing the magnetic filler material in a solution comprising a complexing agent or preparing the magnetic filler material in the presence of a complexing agent; and wherein the complexing agent is selected from the group consisting of an amino acid, ethanolamine, diethanolamine, triethanolamine, 3-aminomethyl-3,5,5-trimethylcyclohexylamine, polyoxypropylenediamine m-phenylenebis(methylamine), 4-methylcyclohexane-1,3-diamine, 2-methylcyclohexane-1,3-diamine, diethylene triamine, triethylene tetramine, tetraethylene pentamine, dipropylene triamine, diethylamino propylamine, N-aminoethylpiperazine, isophoronediamine, xylylenediamine, metaphenylene diamine, diaminodiphenylmethane, diaminodiphenylsulfone, and a mixture of any two or more thereof.

2. The method of claim 1, wherein allowing the composite composition to cure comprises subjecting the composite composition to exposure to a hardener, heating, irradiation with UV or visible light, or exposure to a solvent.

3. The method of claim 1, wherein the method comprises annealing the composite structure after having allowed the composite composition to cure.

4. The method of claim 1, wherein prior to allowing the composite composition to cure, the composite composition is subjected to injection molding or compression molding.

5. The method of claim 1, wherein the surface treatment further comprises a plasma treatment performed by exposing the magnetic filler material to plasma to generate bondable chemical groups on the surface of the magnetic filler material.

6. The method of claim 1, wherein the coating is applied during the filler preparation by exposing the filler to the complexing agent during or after precipitation of the magnetic particles or deposition of a magnetic coating.

7. The method of claim 1, wherein the composite composition comprises magnetic filler material in an amount of at least 20 volume-%, or at least 30 volume-%, or at least 35 volume-%, or at least 40 volume-%, or at least 45 volume-%, or at least 50 volume-% based on the total volume of the composite composition.

8. The method of claim 1, wherein the composite composition comprises magnetic filler material in an amount that is 10-70 volume-%, or 30-60 volume-%, or 45-55 volume-% based on the total volume of the composite composition.

9. The method of claim 1, wherein the resin matrix comprises or consists of a thermosetting resin or a thermoplastic resin.

10. The method of claim 1, wherein the magnetic particles are of spherical, elliptical, rod-like, plate-like, dumbbell-like, or undefined shape.

11. The method of claim 1, wherein the soft magnetic material is selected from a group consisting of Fe, Co, Ni, mu-metal (such as $Ni_{77}Fe_{17}Cu_5Mo$, $Ni_{76}Fe_{17}Cu_5Cr_2$, or $Ni_{81}Fe_{16}Mo_3$), $Ni_4Fe$, $Ni_3Fe$, CoNi, $Co_2Ni_3$, $CosNi_2$, $Co_4Ni$, FeCo, $Fe_7Co_3$, $Fe_{51}C_{049}$, $Fe_{51}Co_{47}V_2$, $Co_8FeNi$, $NiFe_2O_4$, $CoFe_2O_4$, $MnZnFe_4O_8$, or $NiZnFe_4O_8$.

12. The method of claim 1, wherein the composite composition comprises the resin in an amount of 2.5-60 weight-% based on the total amount of the composite composition.

13. The method of claim 1, wherein the composite composition comprises up to 60% of additional additives selected from a group consisting of reinforcements, tougheners, hardeners, softeners, thermoplastic fillers to prompt self-healing, metal chelators to increase the magnetic performance of the composite, and any combinations thereof.

14. A composite structure produced by the method of claim 1.

15. A device with active magnetic bearings, electromagnetic actuators applying force on composite parts or as magnet-powered mobility systems including the composite structure of claim 8.

16. The method of claim 1, wherein the additional filler comprises:

a reinforcement filler selected from the group consisting of carbon fibers, carbon nanofiber, glass fibers, glass nanofibers, ceramic fibers, ceramic nanofibers, aramid fibers, aramid nanofibers, alumina fibers, and alumina nanofibers; and/or a toughening filler selected from the group consisting of ceramic particles, silicon particles, and metal chelators.

17. The method of claim 1, wherein the complexing agent comprises the amino acid.

18. The method of claim 1, wherein the complexing agent is selected from the group consisting of ethanolamine, diethanolamine, and triethanolamine.

19. The method of claim 1, wherein the complexing agent is selected from the group consisting of 3-aminomethyl-3,5,5-trimethylcyclohexylamine, polyoxypropylenediamine m-phenylenebis(methylamine), 4-methylcyclohexane-1,3-diamine, 2-methylcyclohexane-1,3-diamine, diethylene triamine, triethylene tetramine, tetraethylene pentamine, dipropylene triamine, diethylamino propylamine, N-aminoethylpiperazine, isophoronediamine, xylylenediamine, metaphenylene diamine, diaminodiphenylmethane, and diaminodiphenylsulfone.

* * * * *